Patented Feb. 13, 1923.

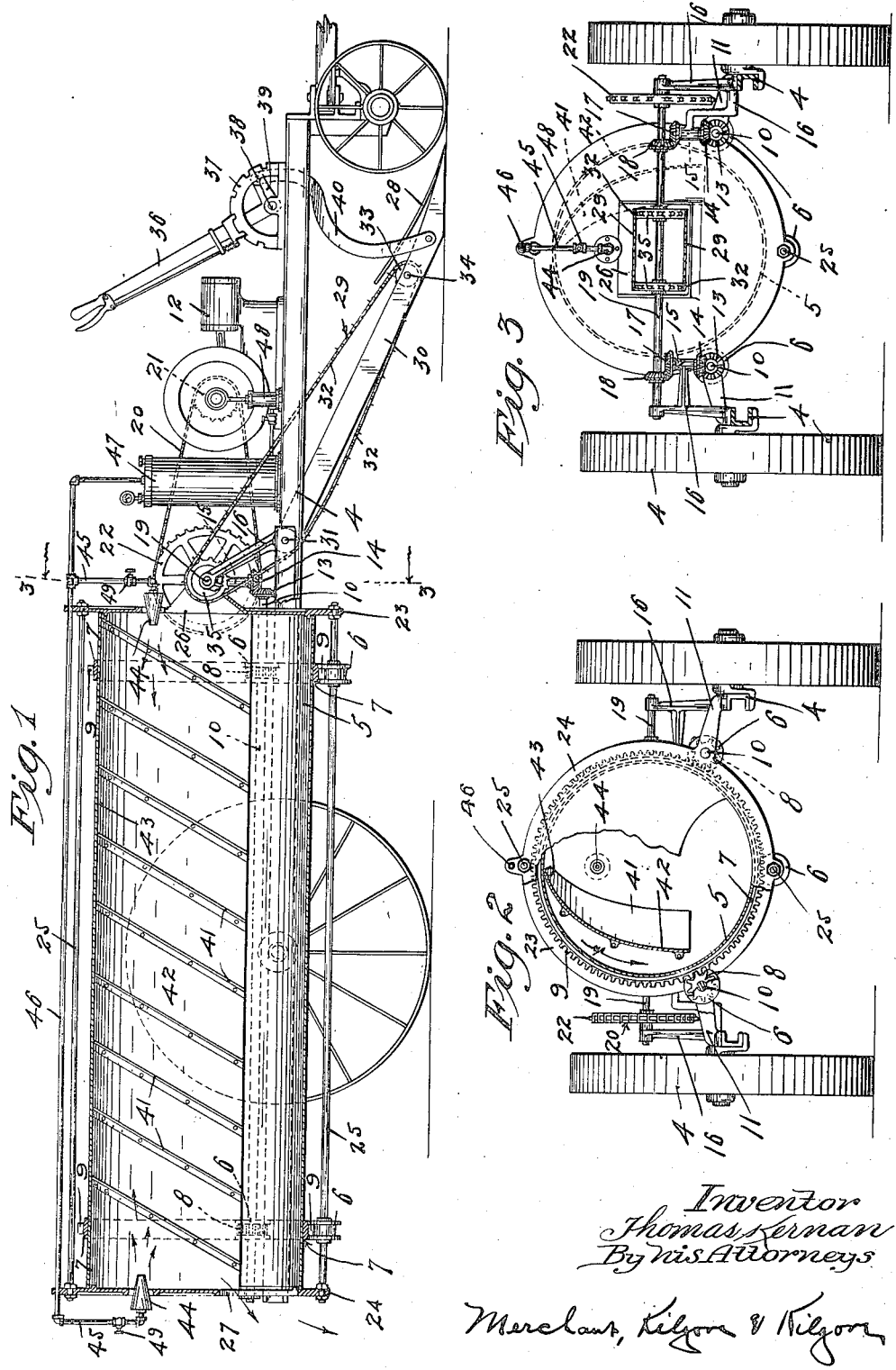

1,444,794

UNITED STATES PATENT OFFICE.

THOMAS KERNAN, OF ST. CLOUD, MINNESOTA.

APPARATUS FOR TREATING THE SOIL.

Application filed December 22, 1920. Serial No. 434,442.

*To all whom it may concern:*

Be it known that I, THOMAS KERNAN, a citizen of the United States, residing at St. Cloud, in the county of Stearns and State of Minnesota, have invented certain new and useful Improvements in Apparatus for Treating the Soil; and I do hereby declare the following to be a full, clear, and exact description of the invention, such as will enable others skilled in the art to which it appertains to make and use the same.

My invention relates to an improved apparatus for treating the soil for the purpose of killing quack grass, wild oats, mustard, Russian thistles and other noxious plant growth, together with their seed, and for destroying all insects, worms, grasshoppers, and the like, together with their eggs, and larvæ, contained in the soil.

To the above end, generally stated, the improved apparatus consists of the novel devices and combination of devices hereinafter described and defined in the claims.

In the accompanying drawings, which illustrate the improved apparatus, like characters indicate like parts throughout the several views.

Referring to the drawings:

Fig. 1 is a view of the improved machine principally in longitudinal central vertical section;

Fig. 2 is a view in rear end elevation, with some parts being broken away and sectioned; and Fig. 3 is a view partly in front elevation and partly in transverse vertical section taken on the line 3—3 of Fig. 1.

The numeral 4 indicates a four-wheel truck, which may be drawn by a tractor or draft animals, or it may be propelled by an engine mounted thereon. A horizontally disposed drum 5, adapted to receive soil at one end and discharge the same from the other, is rotatably mounted on radially spaced side and intermediate wheels 6 having axially spaced flanges arranged to travel on a pair of axially spaced annular track bands 7 secured to said drum. Toothed pinions 8 are formed with the side wheels 6 between the flanges thereof and mesh with ring gears 9 formed with the tracks 7. The side wheels 6 are secured to a pair of longitudinally extended shafts 10 journaled in bearings 11 on the frame of the truck 4.

The shafts 10 are driven in the same direction from an internal combustion engine 12 mounted on the frame of the truck 4 forward of the drum 5 by the following connections: On the front ends of the shafts 10 are bevel gears 13, which mesh with bevel gears 14 on the lower ends of short vertical shafts 15 journaled in bearings 16 on the frame of the truck 4. Bevel gears 17, on the upper ends of the shafts 15, mesh with bevel gears 18 on a countershaft 19 journaled in the bearings 16. A sprocket chain 20 runs over a sprocket wheel 21 on the shaft of the engine 12 and a sprocket wheel 22 on the countershaft 19.

The ends of the drum 5 are closed by fixed front and rear heads 23 and 24, respectively. These heads 23 and 24 are rigidly secured to the frame of the truck 4 by the bearings 11 and are connected by upper and lower tie rods 25. It may be here stated that the intermediate wheels 6 are idle and are loosely journaled on the lower tie rod 25. Formed in the front drum head 23, at the axis thereof, is a rectangular receiving opening 26, through which soil is discharged into the drum 5. The rear drum head 24 has formed therein an opening 27 through which soil in the drum is discharged. It will be noted that the opening 27 is located at the bottom of the drum 5 so that all of the soil in the drum may be discharged therethrough.

During the operation of the machine, the top soil is dug up by a shovel plow 28 from which said soil is delivered into the drum 5 through the opening 26 by an elevator 29 of the slack and belt type. The shovel plow 28 is carried by a pair of forwardly and downwardly extended arms 30, pivoted to a shaft 31, secured to the frame of the truck 4, for vertical swinging movement. The elevator 29 is driven by sprocket chains 32 secured to the longitudinal edges thereof, and which sprocket chains run over sprocket wheels 33 journaled on a shaft 34 mounted in the arms 30 and sprocket wheels 35 secured to the countershaft 19.

To raise and lower the shovel plow 28 and hold the same in different adjustments to determine the depth of cut to be made thereby, there is provided a latch lever 36 and co-operating latch segment 37. Said latch lever 36 is secured to a rock shaft 38 having a pair of crank arms 39 connected to the forward end portions of the arms 30 by links 40. The rock shaft 38 is journaled in bearings on the frame of the truck 4 and to one of said bearings is secured the latch segment 37.

Soil delivered into the drum 5, from the shovel plow 28 by the elevator 29 under the advance movement of the machine, is repeatedly lifted by the upwardly moving side of the rotating drum 5 and then precipitated onto the bottom of said drum. This action breaks up the soil and finely pulverizes the same, and to cause the soil to travel to the rear of the drum 5 by a step by step movement, there is located in said drum, at the downwardly moving side thereof, a plurality of axially spaced spirally arranged segmental propeller blades 41. These propeller blades 41 are rigidly secured to a fixed segmental plate 42, the ends of which are secured to the drum heads 23 and 24.

At the upper longitudinal edge of the plate 42 is a scraper 43 arranged for action on the drum 5 to remove any soil which may adhere thereto. As shown, the scraper 43 is formed by sharpening the upper longitudinal edge of the plate 42, but it may, of course, be made in any other suitable way. Obviously, during each time, the soil is precipitated in the drum 5, the same is carried by the propeller blades 41 a step toward the rear end of said drum until the same is finally discharged therefrom through the opening 27.

To kill quack grass, wild oats, mustard, Russian thistles and other noxious plant growth, together with their seed, and for destroying all insects, worms, grasshoppers, and the like, together with their eggs, and larvæ, contained in the soil, said soil is subjected to a required heat furnished, as shown, by two oil burners 44 which extend into the drum 5 through apertures in the heads 23 and 24. These burners 44 are connected by branch pipes 45 to a main pipe 46 leading from an oil supply tank 47 mounted on the frame of the truck 4. The oil in the tank 47 is kept under the required pressure by a pump 48 operated by the engine 12. Interposed in each branch pipe 45 is a hand valve 49 by means of which the burners 44 may be controlled or entirely shut off so that one or both thereof may be used.

The pulverizing of the soil in the drum 5 is highly important to release therefrom the heretofore noted noxious growth, insects and eggs. By providing the drum 5 with propeller blades 41, it is possible to mount said drum on the frame of the truck 4 in substantially a true horizontal position without means for elevating the front end thereof to cause the soil to move to the rear end of the drum. These propeller blades 41 cause the soil to travel in the drum when the machine is traveling over either level or hilly land. The positive movement of the soil from the receiving to the delivery end of the drum greatly increases the capacity thereof and the machine may be caused to travel at a much faster speed than if the soil were caused to travel through the drum simply by elevating the front end thereof.

What I claim is:

1. In a machine of the kind described, the combination with a drum arranged to receive soil at one end and deliver the same from the other, of means for rotating the drum, and a plurality of axially spaced fixed propeller blades in the drum for imparting steps of axial movement to the soil in the drum under the rotation thereof.

2. In a machine of the kind described, the combination with a drum having fixed heads and arranged to receive soil at one end and deliver the same from the other, of means for rotating the drum, and a plurality of connected axially spaced propeller blades in the drum secured to the heads thereof, said propeller blades being arranged to impart steps of axial movement to the soil in the drum under the rotation thereof.

3. In a machine of the kind described, the combination with a drum arranged to receive soil at one end and deliver the same from the other, of means for rotating the drum, and a plurality of axially spaced fixed propeller blades in the drum for imparting steps of axial movement to the soil in the drum under the rotation thereof, said propeller blades being at the downwardly moving side of the drum.

4. In a machine of the kind described, the combination with a drum arranged to receive soil at one end and deliver the same from the other, of means for rotating the drum, a plurality of axially spaced fixed propeller blades in the drum for imparting steps of axial movement to the soil in the drum under the rotation thereof, and a scraper for action on the drum.

5. In a machine of the kind described, the combination with a drum having fixed heads and arranged to receive soil at one end and deliver the same from the other, of means for rotating the drum, a segmental plate in the drum secured to the heads thereof at the downwardly moving side of the drum, and a plurality of axially spaced propeller blades on said plate, said propeller blades being arranged to impart steps of axial movement to the soil in the drum under the rotation thereof.

6. In a machine of the kind described, the combination with a drum having fixed heads and arranged to receive soil at one end and deliver the same from the other, of means for rotating the drum, a segmental plate in the drum secured to the heads thereof at the downwardly moving side of the drum, the upper edge of said plate affording a scraper for action on the drum, and a plurality of axially spaced propeller blades on said plate, said propeller blades being arranged to impart steps of axial movement to the soil in the drum under the rotation thereof.

In testimony whereof I affix my signature.

THOMAS KERNAN.